Sept. 12, 1950     T. F. MASON     2,521,987
PILOT-CONTROLLED POTATO PEELER
Filed Dec. 8, 1947     2 Sheets-Sheet 1
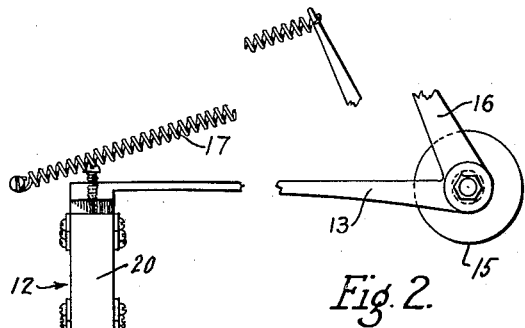
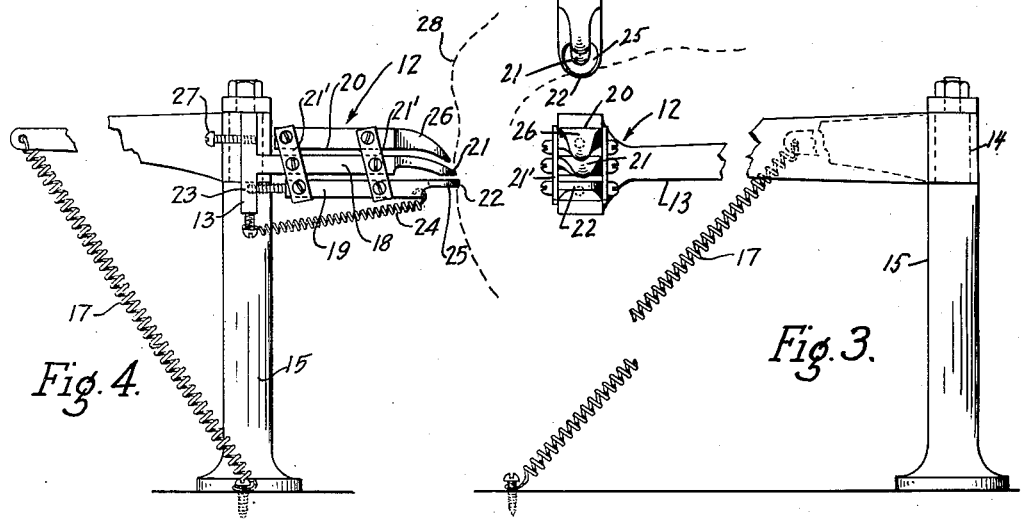
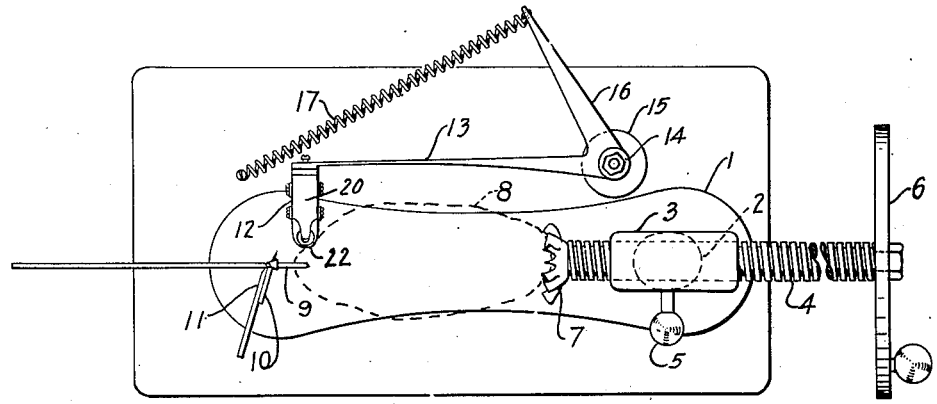
INVENTOR.
THOMAS F. MASON
BY
A. Schapp
ATTORNEY Sept. 12, 1950 T. F. MASON 2,521,987
PILOT-CONTROLLED POTATO PEELER
Filed Dec. 8, 1947 2 Sheets-Sheet 2
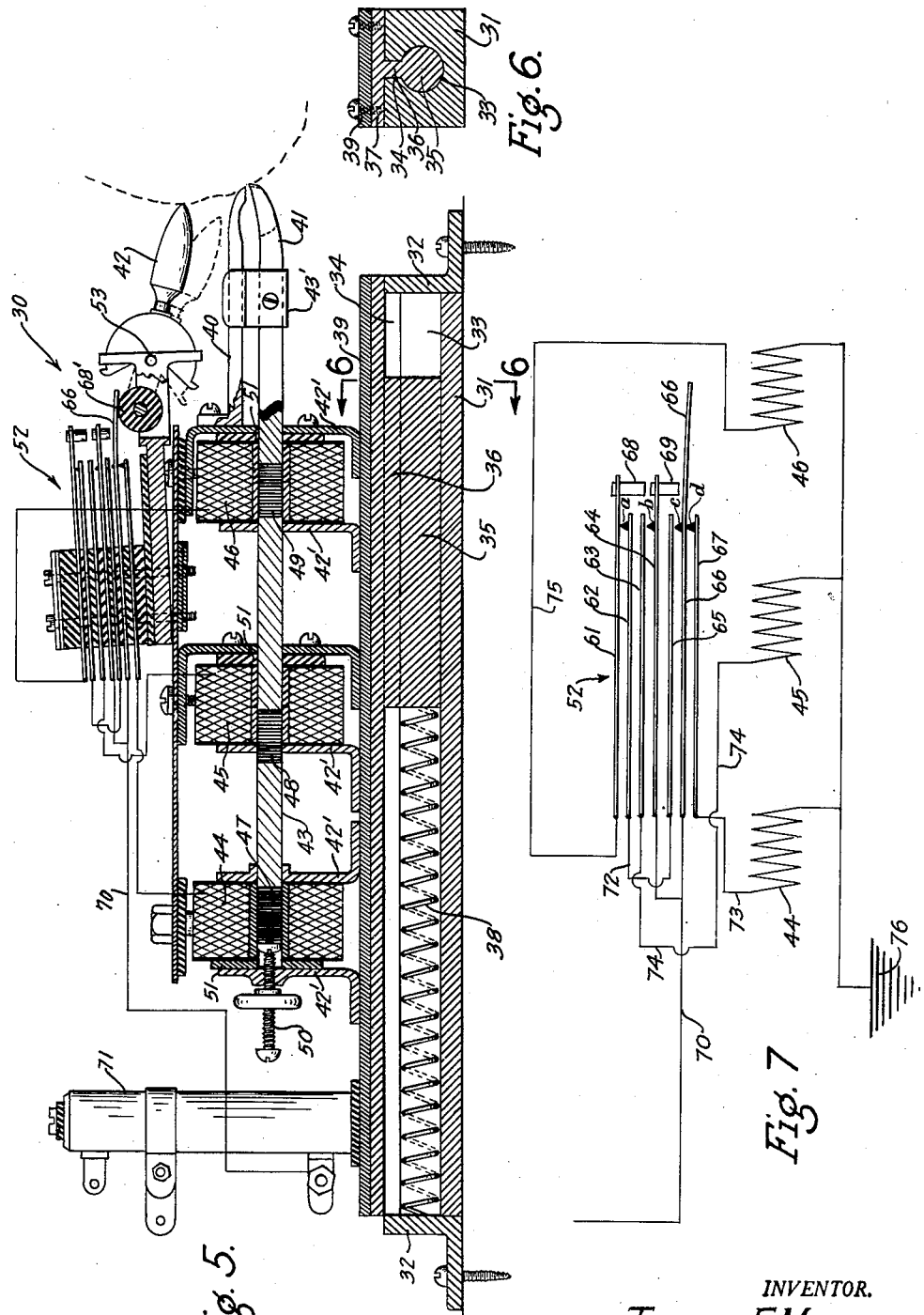
INVENTOR.
THOMAS F. MASON
BY
A. Schapp
ATTORNEY Patented Sept. 12, 1950

2,521,987

UNITED STATES PATENT OFFICE 2,521,987

PILOT-CONTROLLED POTATO PEELER

Thomas F. Mason, San Francisco, Calif.

Application December 8, 1947, Serial No. 790,329

2 Claims. (Cl. 146—43)

The present invention relates to improvements in a potato peeler and is a further development of my potato slicer described in my application Serial Number 732,058, filed May 3, 1947, now Patent 2,489,581, and of my potato cutter described in my application Serial Number 780,513, filed on October 17, 1947, now abandoned.

In the former application it was proposed to provide a machine for slicing a potato or similar vegetable or fruit into a continuous spiral of uniform thickness.

In the second application it was proposed to add a series of transverse cutters whereby the continuous spiral emanating from the first machine would again be cut cylindrically to several different diameters to provide a series of strips of uniform dimensions resembling what is known in the market as shoestring potatoes.

In the present invention it is contemplated to add a further feature to the machine whereby the potato is automatically peeled prior to the cutting action of the first two inventions. While the invention is here described as part of a machine performing all three of the aforesaid functions, it should be understood that the present invention may be used by itself in an independent apparatus if the other functions are not desired.

It has already been proposed to provide a potato peeler in which the potato is advanced in a spiral movement and in which a peeling blade is made to bear upon the side of the potato so as to remove the skin therefrom in a thin continuous slice.

It has further been proposed to provide a machine in which the peeling knife is mounted with freedom of advancing and retracting movement so that it may follow the contour of the potato during the peeling action, and to provide a gauge travelling ahead of the peeling blade so as to limit the depth of the cut.

Potatoes have many different contours and are usually oval in cross-section. But many potatoes depart from this form and have relatively flat or even concave sections on the surface thereof presenting overhangs and undercuts which latter are difficult to reach for the blade when the gauge rides on the overhang. This would cause the blade to miss certain sections adjacent an overhang in the normal operation of the machine.

In order to cause the blade to reach such sections, it is proposed in the present invention to provide a pilot member in advance of the gauge, the pilot member being made to move when riding on an overhang thus encountered and being connected to the blade in such a manner as to cause the latter to plunge forward so as to reach the section underneath the overhang for removing the peel therefrom.

It is further proposed to provide two different ways in which the pilot member is made to actuate the blade, one being mechanical and the other electrical.

Further objects and advantages of my invention will appear as the specification proceeds, and the novel features of my invention will be fully defined in the claims attached hereto.

The preferred forms of my invention are illustrated in the accompanying drawing, in which Figure 1 shows a plan view of my peeling machine in combination with the slicing and cutting features of the previous applications, Figure 2, an enlarged plan view of a cutting head used in my machine, with attendant parts, Figure 3, a side view of the cutter head, looking at it from the axis of rotation of the machine, Figure 4, an end view of the cutter head, Figure 5, an enlarged detail view, in vertical section, of a modified form of cutter head, Figure 6, a sectional detail view taken along line 6—6 of Figure 5, and Figure 7, a wiring diagram for the modified form of cutter head.

While I have shown only the preferred forms of my invention, I wish to have it understood that various changes and modifications may be made within the scope of the claims attached hereto without departing from the spirit of the invention.

Referring to the drawings in detail, and particularly to the form illustrated in Figures 1 to 4, my invention, as disclosed in the previous applications, comprises in its principal features a base 1, having a column 2 rising therefrom near one end thereof, a horizontal bearing 3 supported by the column, a threaded shaft 4 slidable in the bearing, a releasable member 5 engageable in the thread for advancing the shaft when the latter is rotated by means of the hand wheel 6, a gripping member 7 at the inner end of the shaft for holding one end of a potato indicated at 8, a centering pin 9 mounted opposite the gripping member in alinement with the shaft and adapted to receive the free end of the potato thereon, a vertical blade 10 having a vertical cutting edge in the vertical plane of the centering pin and underneath the same for spirally slicing the potato as it is advanced by the threaded shaft and a knife assembly 11 mounted immediately behind the blade, the knife assembly having a series of spaced horizontal blades projecting into the path of the advancing potato for effecting various cylindrical cuts in the spiral issuing from the first blade.

All of these features have been described with greater detail in the two pending applications which are hereby particularly referred to.

The principal feature of the present invention is a peeling device including a cutter head 12 and means for causing the same to bear upon the surface of the advancing potato near the blade 10 with freedom of retracting movement. Any suitable means may be selected for this purpose, and the drawing shows an arm 13 swingable on a post 14 mounted in the column 15, the arm having the cutter head mounted upon the free end thereof. A second arm 16 extends fixedly from the base of the first arm and at an angle thereto, and the free end of the arm is connected to the base by means of a spring 17 which tends to urge the cutter head upon the surface of the potato, as shown.

The cutter head 12 comprises in its principal features a gauge member 18 projecting from the free end of the arm 13 toward the potato, substantially in the horizontal plane of the centering pin, a peeling blade 19 mounted underneath the gauge member, and a pilot member 20 mounted above the blade.

The gauge member which is fixed to the arm and may be formed integral therewith, as shown, is in the form of a flat bar, rectangular in cross-section, and having its free end shaped to present a downwardly curved nose 21 adapted to bear and ride on the surface of the revolving and advancing potato. It is urged upon the surface of the potato by the spring 17, but is free to retract in response to changes in the contour of the potato. It is relatively narrow, and its front edge is curved horizontally as well as vertically so as to be able to follow relatively small depressions such as presented by the eyes of the potato.

The blade 19 and the pilot member 20 are, in their body portions, of substantially the same shape as the gauge member and they are supported with respect to the latter by two pairs of links 21' mounted upon opposite side edges of the assembly, the links running parallel to one another and being pivoted to the fixed gauge member and the blade and the pilot member in the manner shown.

The blade 19 has a cutting edge 22 at the free end thereof and is normally mounted with respect to the gauge so that its cutting edge projects slightly beyond the nose of the gauge member, just sufficient to remove a thin slice of peeling from the potato. It is held in this position by means of an adjustable stop 23 bearing upon the rear end of the blade and a spring 24 tending to urge the blade upon the stop. The thickness of the cut may be adjusted by operation of the stop 23.

The cutting edge 22 is substantially vertical but may be slightly inclined to cut into the potato. A hole 25 is formed immediately behind the cutting edge to allow the peeling to escape therethrough.

The pilot member 20, which is supported by the upper ends of the links, is normally inactive. It has a nose 26 shaped substantially the same as the nose of the gauge, but its nose is always retracted with respect to that of the gauge. Its extreme forward position is controlled by the adjustable stop 23 bearing on the rear end of the blade, and it is apparent that when the stop is shortened, the blade is allowed to retract by the amount of the adjustment while the pilot member is allowed to advance the same distance under the influence of the spring 24.

The pilot member is, however, free to retract from the position shown until stopped by an adjustable stop 27, which is adjusted to allow considerable rearward travel. The pilot member is made to retract by the potato itself when acted on by a section of the potato presenting an overhang, as indicated by the numeral 28, and when thus forced backward, it urges the blade forward with respect to the gauge member and thus allows the blade to reach a section of the potato immediately behind the overhang, which would otherwise be missed by the blade.

In operation, the pilot member 20 is normally inactive. The gauge 21 rides on the surface of the spirally advancing potato and the cutting edge of the blade 19 removes a narrow strip of peeling from the surface of the potato, the peeling escaping through the hole 25. The entire cutter head is urged upon the surface of the potato by the spring 17 and is free to retract in response to changes in the contour of the potato.

The gauge and the blade are sufficiently narrow to enter smallest depressions apt to be found in a large potato, for which the machine is particularly adapted, so as to remove the eyes with the peeling.

A particular problem arises where the potato has a flat side, or is kidney-shaped in cross-section or presents other overhangs, in which case the overhang would normally cause the gauge to retract. This would cause the blade to miss the part immediately behind the overhang, which may be referred to, for the purposes of this description, as an undercut. To meet this situation I provide the pilot member 20, the point of which strikes the overhang in advance of the gauge member and is forced backward by the latter. The retracting movement of the pilot member is accompanied by a forward plunge of the blade 19, through the action of the links 21', and causes the blade to make a deeper cut so as to reach into the undercut and to remove the peeling therefrom.

The cutter head illustrated in Figures 5 to 7 operates on substantially the same principle, except for the fact that the pilot member operates the blade through electrical means, and for some other slight modifications.

In this form the cutter head 30 is mounted with freedom of rectilinear movement with respect to the revolving potato, transversely to the axis of rotation. A rectangular, elongated block 31 is mounted on a suitable base and held in place by end flanges 32. The block is formed with a cylindrical bore 33 and a longitudinal slot 34 above the bore. A piston 35 is slidable in the bore and has an elongated key 36 riding in the slot, the key having a plate 37 formed integral therewith so as to cause the plate to ride on top of the block. A spring 38 within the bore urges the piston to advance in the slot.

A second plate 39 is secured upon the first plate and carries the cutter head. The latter includes a gauge member 40, a blade 41 and a pilot member 42 as in the first-described form. The gauge 40 is fixedly mounted upon an upright 42' rising from the plate near the forward end thereof. The blade 41 is mounted upon the forward end of a plunger 43 slidable in three spaced solenoids 44, 45 and 46 mounted on the plate 39 between additional uprights 42'. The plunger generally is made of non-magnetic material, but has three sections 47, 48 and 49 of magnetic material disposed with respect to the solenoids in such a manner that when the first solenoid is energized, the plunger is retracted to its extreme rearward position, which is the normal working position. This position is controlled by an adjustable stop 50. The plunger may be held against rotary motion by means of a forked member 43' secured upon the plunger and straddling the gauge 40.

When the third solenoid 46 is energized the plunger moves forward through a certain distance causing the cutting edge of the blade to make a deeper cut, and when the second solenoid 45 is energized, the plunger is further advanced for a still deeper cut. Magnetic plates 51 may be arranged in proper positions with respect to the solenoids to increase their efficiency.

The solenoids are energized in their proper order by a suitable switch arrangement 52 which latter is actuated by the pilot member 42 mounted on a fixed pivot 53.

The switch arrangement is of more or less conventional form and comprises seven leaves marked 61 to 67 respectively and arranged in spaced and parallel relation, the free end of the leaf 66 projecting beyond the other leaves for operation by a roller 68' mounted upon the rear end of the pilot member 42. The leaves 61 and 64 also project a somewhat less distance beyond the remaining leaves and carry operating studs 68 and 69. The leaves 62, 64, 66 and 67 carry contact points marked a, b, c and d respectively.

A line wire 70, after passing through a resistance 71, is connected to the two leaves 64 and 66, as shown. The two leaves 62 and 65 are interconnected by a wire 72, and the leaf 67 is connected, through wire 73, with the solenoid 44. The leaf 63 is connected, through wire 74, with the second solenoid 45, and the leaf 61 is connected, through wire 75, with the third solenoid 46, the three solenoids being grounded as at 76.

In operation, the pilot member 42 will normally occupy the inclined position shown in Figure 5. In this position the contacts b and c do not connect with the superimposed leaves. Contact a connects with leaf 61 and the contact d connects leaves 66 and 67, closing a circuit through wire 70, the two leaves and wire 73 to the first solenoid 44. This holds the plunger 43 in the most retracted position.

As the pilot member 42 rides over a slight overhang, it is depressed and raises the free end of the leaf 66 to a slight extent, sufficient to break contact at d, thus de-energizing solenoid 44, and to make contact c connect with the leaf 65. A current now flows from wire 70 through leaf 66, contact c, leaf 65, wire 72, leaf 62, contact a, leaf 61 and wire 75 to the third solenoid 46, causing the plunger 43 to move forward through an intermediate distance for making a deeper cut.

When the pilot 42 rides over a more pronounced overhang, it is depressed still further and the rear end of the pilot raises the free end of leaf 66 sufficiently far to connect contact c with leaf 65 and contact b with leaf 63 (by means of actuating stud 69), while disconnecting contact a. Current now flows from wire 70 through leaf 64, contact b, leaf 63 and wire 74 to the second solenoid 45 which causes plunger 43 to advance still further for a deeper cut.

Thus the cutting blade is advanced for peeling undercuts in the manner as in the first-described form, but the potato is relieved of the physical work involved in advancing the cutting blade, and the second form may be regarded as being somewhat more sensitive than the first form.

I claim:

1. In a potato peeler, a supporting block, a piston slidable therein rectilinearly and having a frame supported thereby, a gauge member supported by the frame and having a nose adapted for riding upon the side of a revolving potato, spring means active on the piston for urging the gauge member upon the potato, a plurality of solenoids mounted in the frame in axial alinement with each other and having a plunger therein, the plunger having a cutting blade immediately below the gauge member for peeling the potato and having magnetic sections in cooperative relation with the solenoids, one magnetic section being arranged with respect to its solenoid to pull the plunger backward when the solenoid is energized, and another section being arranged with respect to its solenoid to pull the plunger forward when the solenoid is energized, an adjustable stop member bearing on the rear end of the plunger for limiting its rearward movement to insure a minimum cut for the cutting blade, a pilot member pivoted in the frame and positioned to bear on the potato in advance of the gauge member, an electric circuit for the solenoids including a switch operable by the pilot member for selectively rendering the solenoids active in response to changes in the contour of the potato, and means for supporting a potato adjacent the cutting blade, gauge and pilot member and for moving the potato relative thereto to successively engage the pilot member, gauge and cutting blade.

2. In a potato peeler, a frame having a gauge member projecting therefrom, means for movably mounting the frame to cause the gauge member to ride upon the side of a revolving potato, spring means active on the frame for urging the gauge member upon the potato, a plurality of solenoids mounted in the frame in axial alinement with each other and having a plunger therein, the plunger having a cutting blade immediately below the gauge member for peeling the potato and having magnetic sections in cooperative relation with the solenoids, one magnetic section being arranged with respect to its solenoid to pull the plunger backward when the solenoid is energized, and another section being arranged with respect to its solenoid to pull the plunger forward when the solenoid is energized, an adjustable stop member bearing on the rear end of the plunger for limiting its rearward movement to insure a minimum cut for the cutting blade, a pilot member pivoted in the frame and positioned to bear on the potato in advance of the gauge member, an electric circuit for the solenoids including a switch operable by the pilot member for selectively rendering the solenoids active in response to changes in the contour of the potato, and means for supporting a potato adjacent the cutting blade, gauge and pilot member and for moving the potato relative thereto to successively engage the pilot member, gauge and cutting blade.

THOMAS F. MASON.

REFERENCES CITED

The following references are of record in the file of this patent:

UNITED STATES PATENTS

| Number | Name | Date |
| --- | --- | --- |
| 319,905 | Hudson | June 9, 1885 |
| 633,932 | Williamson | Sept. 26, 1899 |
| 943,249 | Jahansan | Dec. 14, 1909 |
| 2,069,654 | Jeppsson | Feb. 2, 1937 |
| 2,156,645 | Waller | May 2, 1939 |